US008756205B2

United States Patent
Fürst et al.

(10) Patent No.: US 8,756,205 B2
(45) Date of Patent: Jun. 17, 2014

(54) SYSTEM AND METHOD FOR RULE-BASED DATA OBJECT MATCHING

(75) Inventors: Karl Fürst, Wiesloch (DE); Andrea Langlotz, Heidelberg (DE); David Brookler, Los Angeles, CA (US); Dave Sullivan, Canoga Park, CA (US); Eugene Cherny, Los Angeles, CA (US)

(73) Assignee: SAP AG, Walldorf (DE)

( * ) Notice: Subject to any disclaimer, the term of this patent is extended or adjusted under 35 U.S.C. 154(b) by 491 days.

(21) Appl. No.: 12/623,229

(22) Filed: Nov. 20, 2009

(65) Prior Publication Data
US 2010/0070460 A1 Mar. 18, 2010

Related U.S. Application Data

(63) Continuation-in-part of application No. 11/120,541, filed on May 2, 2005, now Pat. No. 7,644,055.

(51) Int. Cl.
*G06F 17/30* (2006.01)
(52) U.S. Cl.
USPC .......................... 707/690; 707/691; 707/692
(58) Field of Classification Search
CPC ................................................ G06F 17/30286
USPC .................................. 707/687, 690, 691, 692
See application file for complete search history.

(56) References Cited

U.S. PATENT DOCUMENTS

| 5,504,890 | A  | * | 4/1996  | Sanford ................. 707/999.003 |
| 6,236,993 | B1 | * | 5/2001  | Fanberg ........................ 707/690 |
| 6,691,103 | B1 | * | 2/2004  | Wozny ................... 707/999.002 |
| 6,968,348 | B1 | * | 11/2005 | Carone et al. ................. 707/741 |
| 7,092,977 | B2 |   | 8/2006  | Leung et al. |
| 7,236,973 | B2 |   | 6/2007  | Kalthoff et al. |
| 7,376,680 | B1 | * | 5/2008  | Kettler et al. .......... 707/999.205 |
| 7,403,942 | B1 | * | 7/2008  | Bayliss ........................ 707/748 |
| 2004/0030649 | A1 | * | 2/2004  | Nelson et al. .................... 705/44 |

OTHER PUBLICATIONS

Hernandez, et al. Real-world Data is Dirty: Data Cleansing and The Merge/Purge Problem, Data Mining and Knowledge Discovery, 2, 9-37 (1998), Netherlands.

* cited by examiner

*Primary Examiner* — Vincent F Boccio
(74) *Attorney, Agent, or Firm* — Buckley, Maschoff & Talwalkar LLC

(57) ABSTRACT

An object matching system comprises a plurality of disparate databases comprising data objects and a master data server. The master data server comprises a computer programmed to provide a plurality of adapters configured to connect to said plurality of disparate databases, a matching module configured to compare data objects provided by said plurality of adapters through use of an object matching rule to determine at least two matching data objects, and a data integrator configured to merge said at least two matching data objects to produce a master data object.

16 Claims, 7 Drawing Sheets

SYSTEM AND METHOD FOR RULE-BASED DATA OBJECT MATCHING

CROSS REFERENCE TO RELATED APPLICATION

This application is a continuation-in-part of U.S. patent application Ser. No. 11/120,541, filed May 2, 2005 now U.S. Pat. No. 7,644,055, which is herein incorporated by reference in its entirety to provide continuity of disclosure.

BACKGROUND OF THE INVENTION

1. Field of the Invention

Embodiments described herein pertain to the field of computer software. More particularly, but not by way of limitation, one or more embodiments enable systems to apply a set of rules to determine if two or more data objects are similar in accordance with the defined set of rules 2. Description of the Related Art Modern businesses have a need to utilize stored business data to make effective business decisions. When the data in these systems is not shared and made consistent, inefficiencies occur. Achieving consistent data across multiple distributed heterogeneous systems is difficult. Establishing effective communication links between disparate systems is a prerequisite to making the data consistent, but does not alone solve the problem. Even when data is effectively shared throughout an organization, problems still arise in that over the course of time the data may exist in different forms and models. Since it is common for companies to maintain data in independent realms the achievement of data consistency is difficult. For example, because of the difficulties associated with merging data, some companies independently maintain data for each of their different corporate divisions and only utilize such data for business decisions relevant to a particular corporate division. However, the maintenance of data from independent systems is often desirable during mergers and acquisitions where company systems are almost certainly heterogeneous and typically utilize radically different structures and data models.

To solve the data consistency problem and leverage the commonalities of data for the benefit of the company, companies typically seek to coordinate interaction between heterogeneous systems by identifying similar and overlapping data and then coordinating the integration of such data in a way that ensures the data stays consistent across different systems. Effectively accomplishing such coordination is difficult at best and tends to lead to organizational inefficiencies. One approach some organizations use is to maintain what is known as master data. Master data may be thought of as the definitive version of a data object. Solutions for coordinating the data, i.e., storing, augmenting and consolidating master data, are generally primitive and lack matching capabilities. Moreover, the fact that master data may exist does little to provide information technology personnel with insight about the process used in determining if an object matches another object.

Master data management systems simplify maintenance and promote data integrity by simplifying the user's view of the data stored in its repository. For example, SAP's Master Data Management Environment (MDME) system is an integrated system for master data management that uses a Structured Query Language (SQL) database management system (DBMS), but does not require designers to use SQL for searching, sorting, and retrieving of information. Standard SQL DBMS do not support the types of advanced structures necessary for managing master databases. Generally speaking, master data management systems consist of a thick shell of functionality on top of a SQL-based DBMS to provide a scalable database where data is fully accessible to other applications and tools.

Failing to successfully coordinate master data objects when merging heterogeneous data bases may yield data object redundancies and inconsistencies that compromise the data, disrupt the business decision-making process and increase the overall cost of doing business. Furthermore, customer service may suffer from incomplete data requiring customers to call multiple places within the same company to obtain the required information. In some cases the failure to efficiently service customers may cause enough frustration that it begins to result in decreased customer loyalty and leads to a loss of customers.

Because of the limitations described above there is a need for a system and method that can effectively coordinate master data management data objects across an enterprise.

SUMMARY OF THE INVENTION

One or more embodiments enable systems to implement a rule-based approach to data object matching that enables the system to determine if two or more objects are similar. Once a set of two or more objects is determined to be similar, the system can merge the object set into one master data object or do any other further processing based on the matching result. The rules define what conditions are required to consider two or more objects as being similar or equal.

A certainty or confidence setting may be specified and then associated with each rule. Examples of the different indicators of certainty setting include, but are not limited to "automatic", "manual high probability", "manual medium probability", and "manual low probability". For example, the certainty setting "automatic" specifies that the objects can be considered matches and no additional manual verification is needed. The certainty setting "manual low probability" specifies that there is a low probability that the objects are truly matches and that a manual verification is needed.

Matching rules may be grouped by priority in such a way that if any matches are found in one priority group the matching process stops. If matches are not found, the next highest priority group of rules is processed.

Hierarchical matching rules may be specified that are able to express similarity of objects considering structured objects containing sub-objects in a hierarchical manner.

If no matching rule is defined a default rule may be applied. The ability to apply a default rule is particularly useful in embodiments that requires all fields of an object to be used for matching (e.g., two objects match if they are absolutely identical).

DETAILED DESCRIPTION OF THE INVENTION

A system and method for rule-based data object matching will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
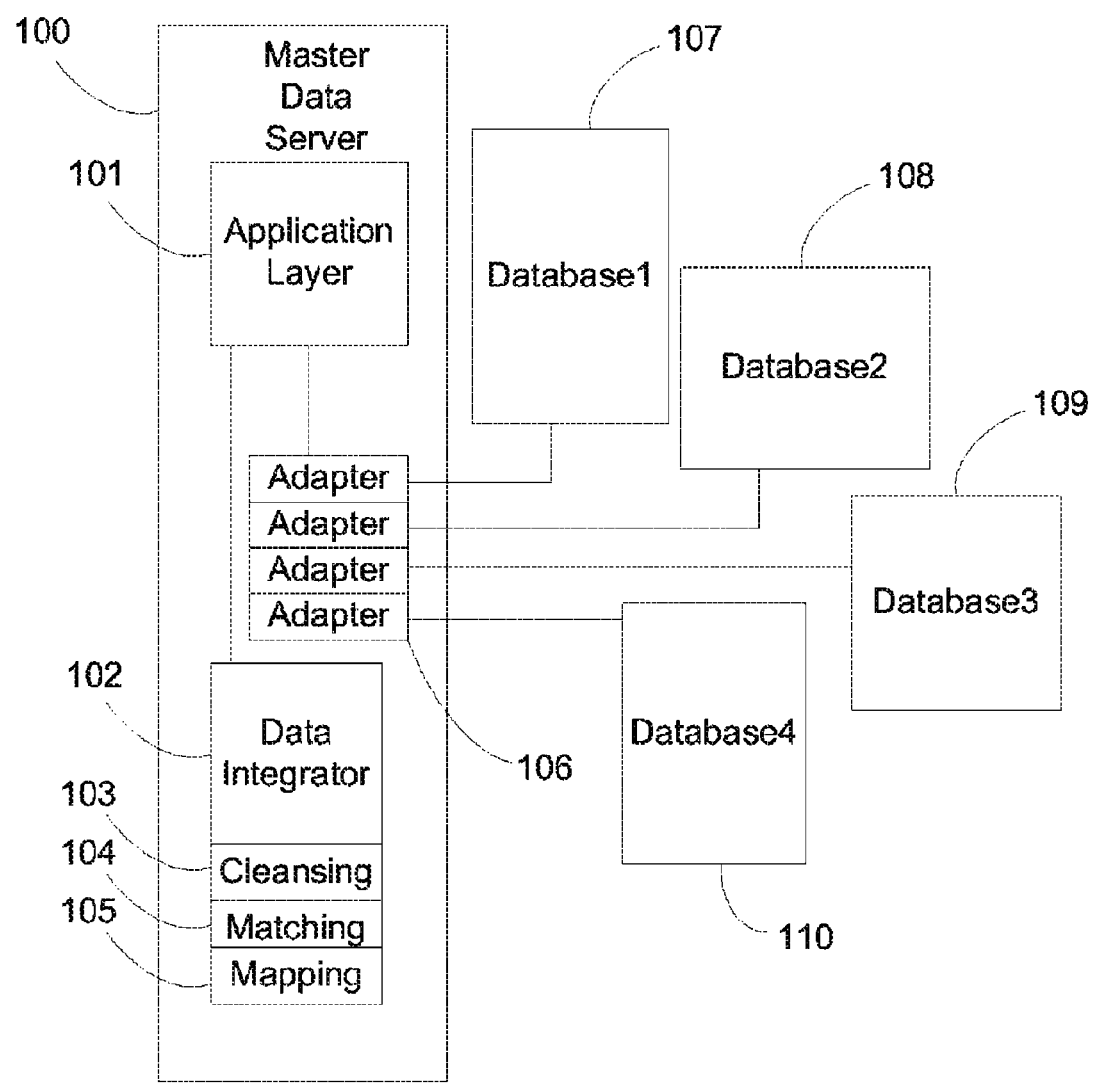
FIG. 1 illustrates an architectural view of a system utilizing one or more embodiments of the system and method for rule-based data object matching.

FIG. 1 illustrates an architectural view of a system utilizing an embodiment of the invention. In one or more embodiments, the system is implemented on one or more computers in accordance with FIG. 7. The one or more computers may be programmed to operate as a specially programmed computer capable of implementing one or more methods, apparatus and/or systems described herein.

Master Data Server 100 comprises an application layer 101 that interfaces with users authorized to view master data. The application layer makes use of adapters 106 that bridge the networks to the disparate databases 107, 108, 109 and 110. The adapters may make use of communications technologies such as robust message queuing to ensure that data is reliably transferred. Each adapter may be customized to interface to a specific system or database. Data integrator 102 is utilized by application layer 101 to integrate data from the disparate sources and is configured with cleansing 103, matching 104, and mapping 105 modules. Matching module 104 is configured to implement one or more embodiments of the invention. Modifications to data in database 108 for example may be extended to the other databases via mapping module 105 while cleansing module 103 may be utilized to perform initial cleansing or periodic cleansing of data to ensure the master data is appropriately harmonized. Regardless of the functions of the other modules, matching module 104 is charged with the task of performing matches on whatever data objects are presented to it.

Entry of rules is accomplished via an interface such as a text based interface or a graphical user interface that allows a user to point and click in order to create and modify rules graphically. Any interface that enables the entry of rules is in keeping with the spirit of the invention.

Figure 2:
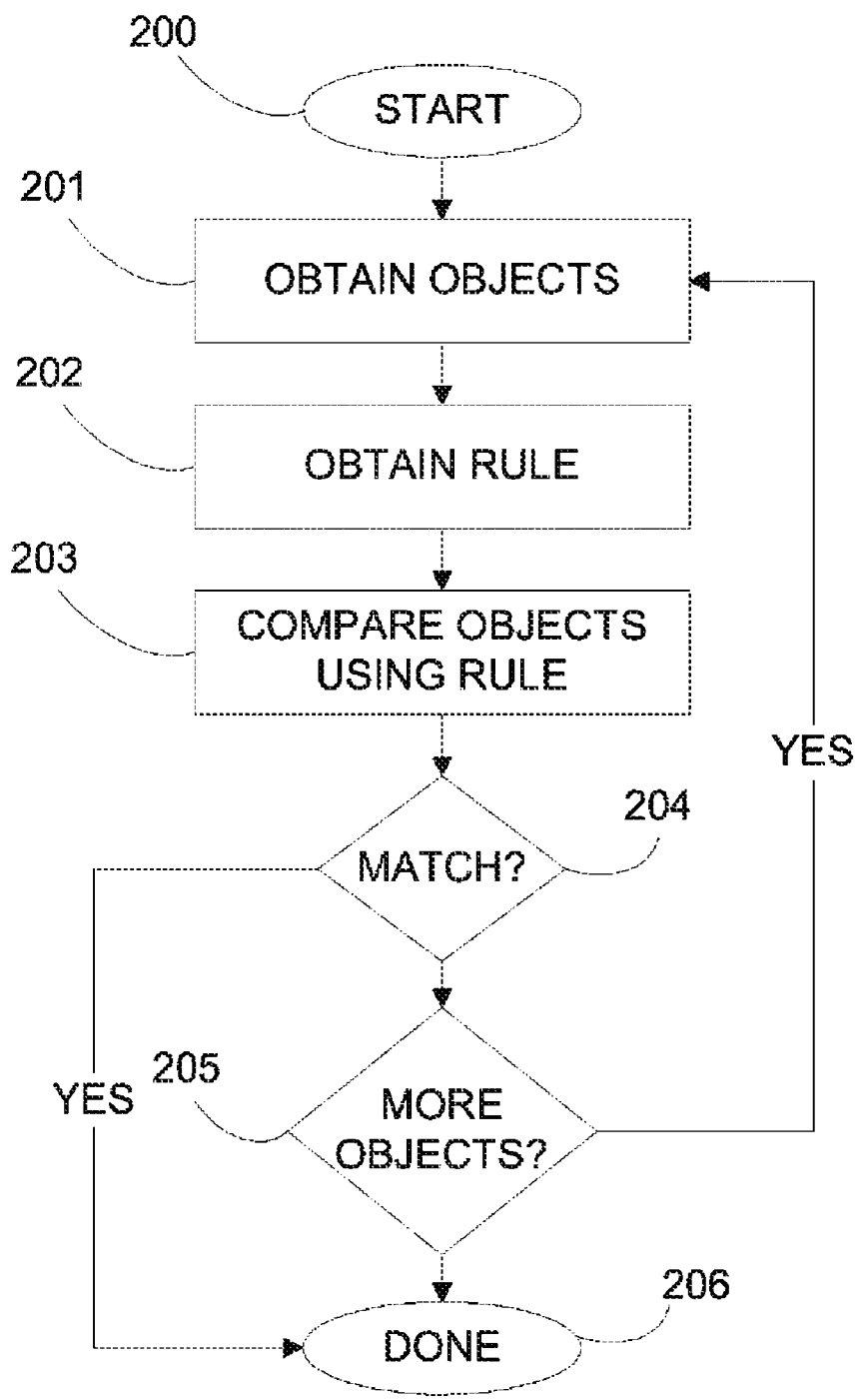
FIG. 2 illustrates a flow chart showing rule based matching in one or more embodiments of the system and method for rule-based data object matching.

FIG. 2 illustrates a flow chart of the rule based matching process as it occurs in accordance with one or more embodiments of the invention. Processing starts at step 200 by executing a rule or by data mining a set of target objects to match against at step 201. For instance, the system can obtain a group of active objects or instantiate a set of target objects for subsequent processing. A rule is obtained at step 202 and this rule may be a default rule that compares all fields of a source and target object if no user defined rule is specified. The rule is executed and thus the objects are compared at step 203. If there is a match, the flow of control passes to step 206. If there are more objects to compare as determined at step 205, then the process repeats at 201.

Figure 3:
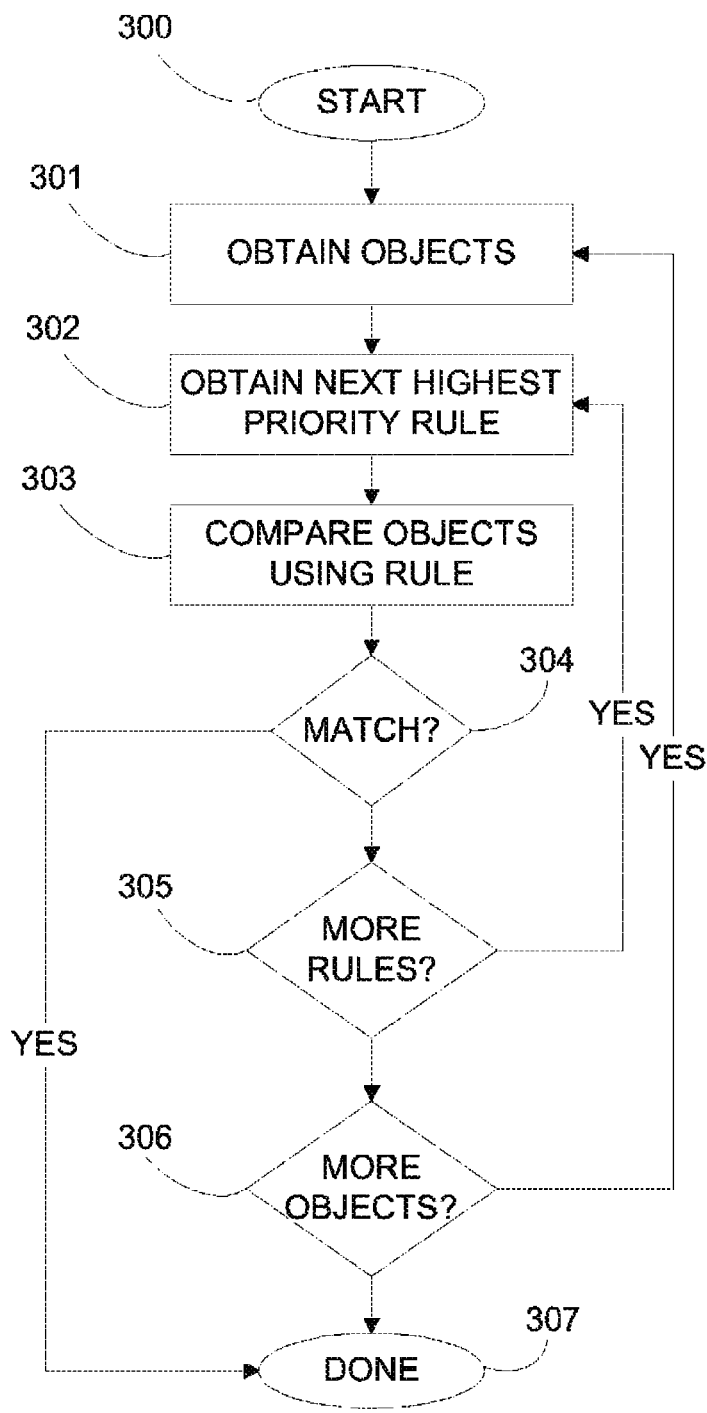
FIG. 3 illustrates a flow chart showing priority rule based matching in one or more embodiments of the system and method for rule-based data object matching.

FIG. 3 illustrates a flow chart of an approach to priority rule based matching. In this embodiment of the invention processing starts at 300 with objects obtained at step 301. The next highest priority rule is obtained at step 302 and this rule may be a default rule that compares all fields of a source and target object if no user defined rule is specified. The objects are compared at step 303 and if there is a match, the flow of control passes to step 307. If there are more rules to process as determined at step 305, then the flow of control passes to step 302. If there are more objects to compare as determined at step 306, then the process repeats at step 301. When there are no more objects to process, control passes to step 307 without producing a match.

Figure 4:
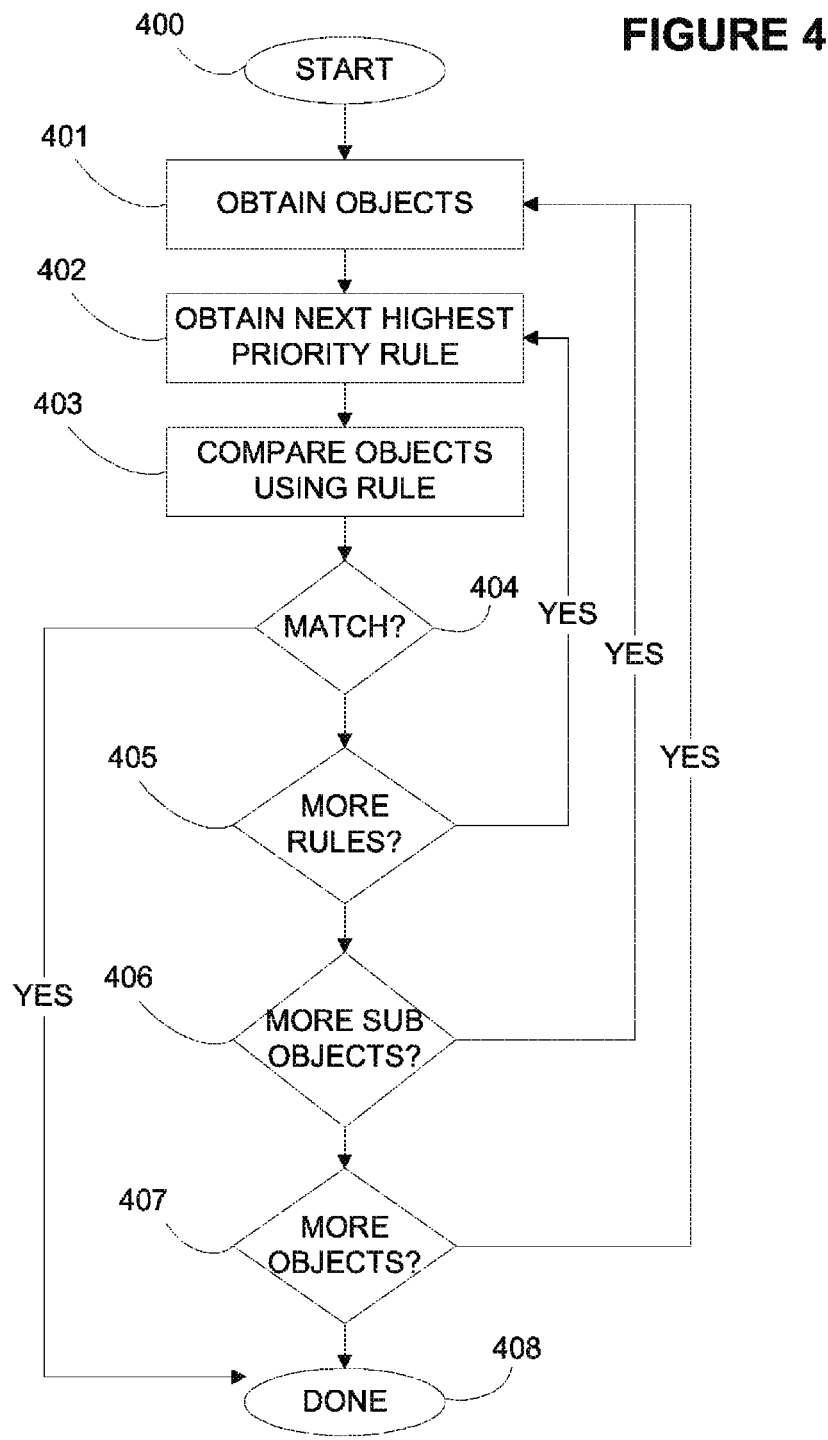
FIG. 4 illustrates a flow chart showing priority and hierarchical object rule based matching in one or more embodiments of the system and method for rule-based data object matching.

FIG. 4 illustrates a flow chart of an embodiment of the invention that utilizes a priority and hierarchical approach to perform rule based matching of objects. In this embodiment of the invention, processing starts at step 400 with objects obtained at step 401. Objects obtained at step 401 may comprise related objects such as sub objects of other objects in the repository, sub objects of other objects in the same process chain and/or sub objects of the current object itself. Hence when processing is applied against a set of objects it is also applied as needed to sub objects and/or related objects. The next highest priority rule is obtained at step 402 and this rule may be a default rule that compares all fields of a source and target object if no user defined rule is specified. The objects are compared at step 403 and if there is a match, the flow of control passes to done step 408. If there are more rules to process as determined at step 405, then the flow of control passes to step 402. If there are more sub objects to compare as determined at step 306, then sub objects are further traversed at step 401. For instance, if the parent objects match the sub object matching initiates. If there are more objects to compare as determined at step 407, then the process repeats at step 401. When there are no more objects to process, control passes to step 408 without producing a match.

Figure 5:
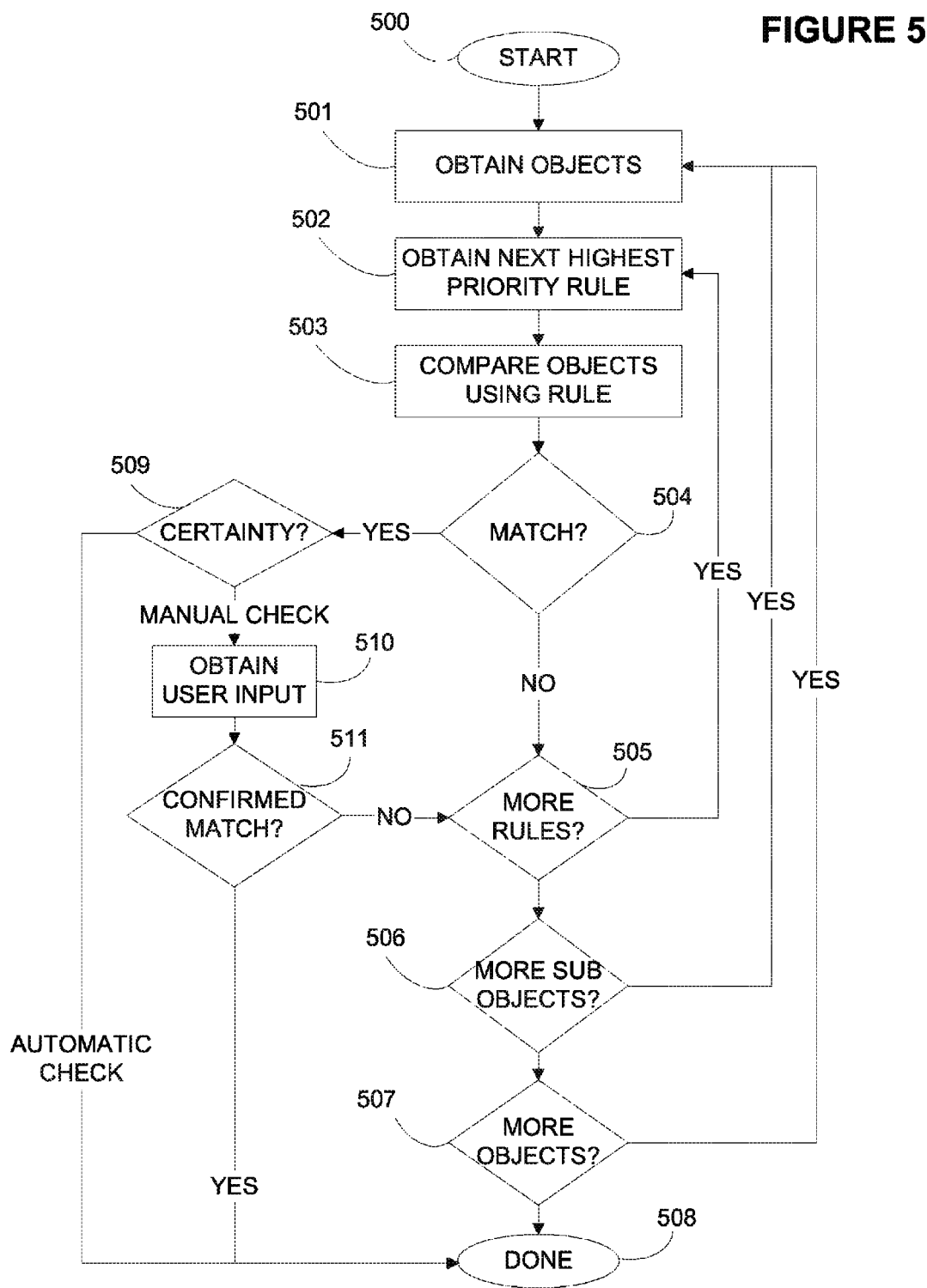
FIG. 5 illustrates a flow chart showing priority and hierarchical rule based matching with automatic and manual certainty testing in one or more embodiments of the system and method for rule-based data object matching.

FIG. 5 illustrates a flow chart of the invention that utilizes a priority and hierarchical rule based approach to matching with automatic and manual certainty testing. In this embodiment of the invention, processing starts at step 500 with objects obtained at step 501. Objects obtained at step 501 may comprise related objects such as all sub objects of other objects in the repository, all sub objects of other objects in the same process chain or all sub objects of the current object itself. The next highest priority rule is obtained at step 502 and this rule may be a default rule that compares all fields of a source and target object if no user defined rule is specified. The objects are compared at step 503 and if there is a match, the flow of control passes to the certainty test at step 509. If the certainty value of the match is automatic then control flows to done step 508. If the certainty value of the match is manual, then the user is queried to determine if the match is valid or not at step 510. If the user confirms a valid match at step 511, then flow of control passes to step 508. If the user determines that there is a false match at step 511, then flow of control passes to step 505 in order to check for more rules. If there are more rules to process as determined at step 505, then the flow of control passes to step 502. If there are more sub objects to compare as determined at step 506, then sub objects are further traversed at step 501. If there are more objects to compare as determined at step 507, then the process repeats at step 501. When there are no more objects to process, control passes to step 508 without producing a match.

Figure 6:
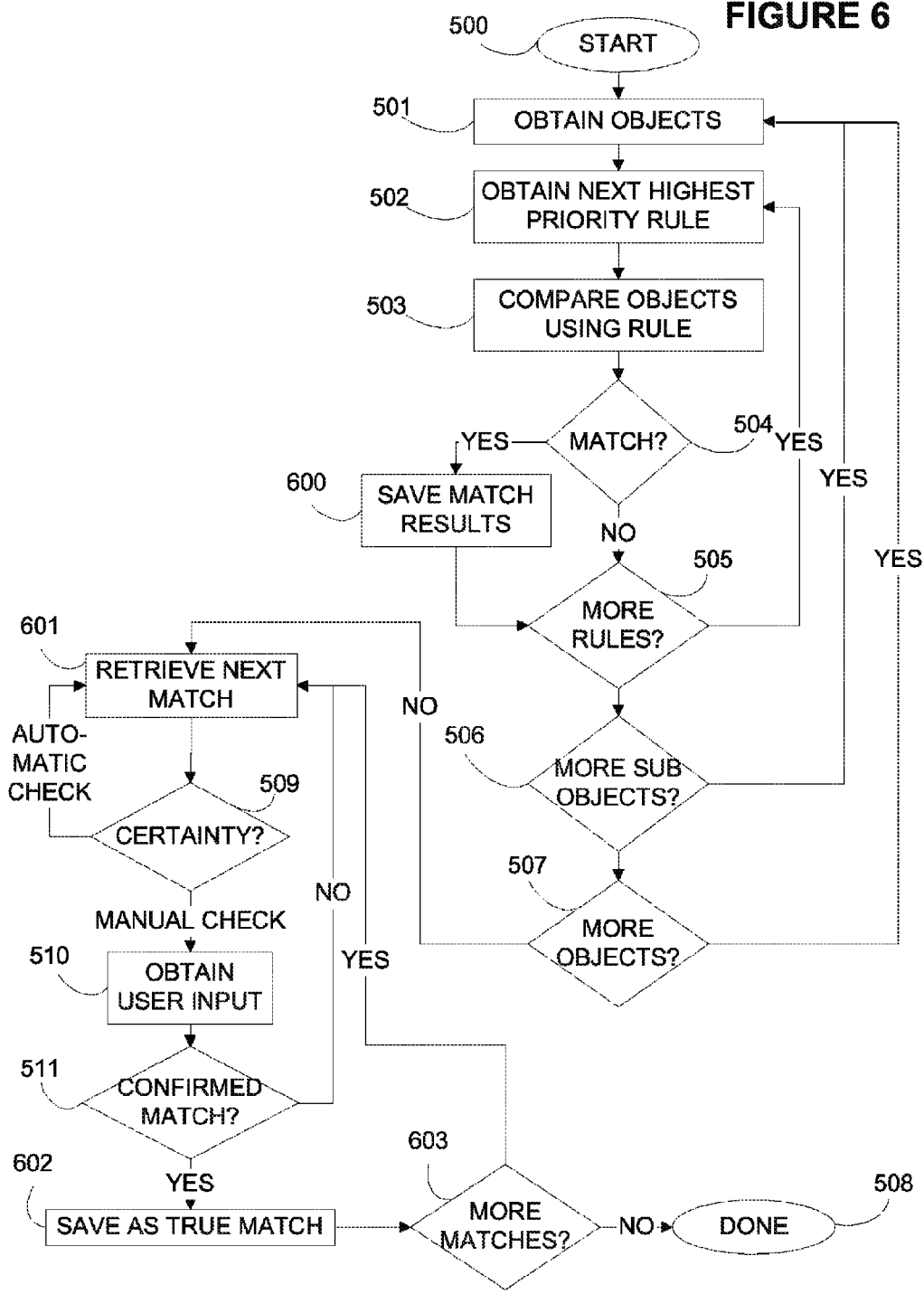
FIG. 6 illustrates a flow chart showing priority and hierarchical rule based matching with automatic certainty testing followed by a manual certainty testing phase in one or more embodiments of the system and method for rule-based data object matching.

FIG. 6 illustrates a flow chart of the invention that utilizes a priority and hierarchical rule based approach to matching with automatic and manual certainty testing. In contrast to the embodiment illustrated in FIG. 5, the manual certainty testing is performed subsequent to the automatic certainty testing. In this example the user decision is not part of the matching but part of the subsequent processing of the matching result which is independent of the matching itself. Objects obtained at step 501 may comprise related objects such as all sub objects of other objects in the repository, all sub objects of other objects in the same process chain or all sub objects of the current object itself. The next highest priority rule is obtained at step 502 and this rule may be a default rule that compares all fields of a source and target object if no user defined rule is specified. The objects are compared at step 503 and if there is a match, then the match result is saved at 600 for subsequent manual processing. If there is no match at 503, then processing continues for all rules at 505. If there are more rules to process as determined at step 505, then the flow of control passes to step 502. If there are more sub objects to compare as determined at step 506, then sub objects are further traversed at step 501. If there are more objects to compare as determined at step 507, then the process repeats at step 501. When there are no more objects to process, control passes to step 601 where saved matches are retrieved (if there are no matches then processing completes and this is not shown as an output from 601 for ease of illustration). If the certainty of the match is set to automatic, then the next match is retrieved at 601. If the certainty value of the match is manual, then the user is queried to determine if the match is valid or not at step 510. If the user confirms a valid match at step 511, then the match is saved as a true match at 603 to determine if there are more saved matches to check. If there are more matches to check control passes to 601 where the next saved match is retrieved. If there are no more matches to process then the process ends at 508.

A graphical user interface may be utilized to input the rules and a parser may provide a mechanism for validating the syntax of the rules. Text based or any other type of interface may also be used in order to allow a user to enter rules.

The operators for use in the rule based matching are described in the following tables:

Source-Field Modification Operators:

These operators are applied to the source-field.

| Operator | Description |
| --- | --- |
| LEFT(field, n) | Extract the left n characters from field |
| RIGHT(field, n) | Extract the right n characters from field |
| SUBSTRING(field, start-pos, n) | Extract n characters from field starting with start-pos |
| ADD_PREFIX(field, string) | Adds a prefix-string to the source field |
| ADD_SUFFIX(field, string) | Adds a suffix-string to the source field |

Operators for Comparing Source and Target:

These operators generally comprise three parameters, the two values and a fuzziness parameter. The fuzziness parameter is optional and if not specified yields a rule with no fuzziness utilized in a match using the rule. The default value for fuzziness is 0 which means that no fuzziness is specified by the rule. The fuzzy evaluation may consider sounds-like, transposition of letters, doubling of a letter, adjacent-on-keyboard or any other algorithm for specifying near matches to signify true matches.

If the operators only comprise one field, or one field and an optional fuzziness value, then both target and source fields have the same name.

If the target-value exists normalized, the source-value is automatically normalized before any of the comparing operators is called. The normalized target-value is used for comparison.

| Operator | Description |
| --- | --- |
| EQUAL(field-source, field-target, fuzziness, compare) | (modified) source and target are equal and both are not null |
| COMPARE(fuzziness) | comparison operation (e.g., distance, sounds like, adjacent on keyboard, etc . . . ) |
| CONTAINS(field-source, field-target, fuzziness, compare) | (modified) source is contained in target and both are not null |
| STARTS_WITH(field-source, field-target, fuzziness, compare) | target starts with (modified) source and both are not null |
| ENDS_WITH(field-source, field-target, fuzziness, compare) | target ends with (modified) source and both are not null |
| NULL(field, source/target) | field of source or target is null |
| NORMALIZE(field-source, field-target) | normalize a source and/or target field if either is specified, (for example for a text field make all characters upper case). |

The examples shown below contain often one field value only. If this is the case, the field name of source and target are the same.

Logical Operators.

The following logical operators can be used to build up complex rules

| Operator | Description |
| --- | --- |
| exp1 AND exp2 | Logical AND of expression1 and expression2 |
| exp1 OR exp2 | Logical OR of expression1 and expression2 |
| NOT(exp) | Logical NOT of expression |

Sub-objects (e.g. addresses or material segments) related objects (e.g. a vendor of a product) are addressed using the OBJECT operator.

For matching it is assumed that one (sub) object at a time is compared to either all sub objects of other objects in the repository, all sub objects of other objects in the same process chain or all sub objects of the current object itself.

If no matching rules for sub objects are defined the sub objects should not be used for determining matching results.

The following parameters are used in matching sub objects specified within the OBJECT-BEGIN and OBJECT-END operator pair, for example:

OBJECT-BEGIN(FIELD, SELECTION, ANY/ALL)
OBJECT-END

| Parameter | Description |
| --- | --- |
| SELECTION | Selects a subset of the fields relevant for matching e.g. for a plant dependent sub object the selection plant = 1000 |
| ANY | If any (one or more) sub objects of the current object matches the sub objects of the other object the sub objects match. |

-continued

| Parameter | Description |
| --- | --- |
| ALL | If all sub objects of the current object match the sub objects of the other object the sub objects match |

The following examples show various combinations of operators for performing various matches.

Example 1 shows three rules that may be performed in the order shown thereby providing a priority for the rules. The example shows an automatic certainty rule that will result in a positive match if both the target and source objects have the same values for DUNS (Data Universal Numbering System) and TAX (e.g., tax identification number) respectively. In the next highest priority rule, a high certainty manual rule that allows a user to verify that a match exists for a source or target object that has a NULL value for TAX if both the source and target objects have the same DUNS value. Finally, the next highest priority rule specifies the converse test with respect to the last described rule, i.e., if both source and target objects have the same value for TAX and either one has a NULL value for DUNS then the object is probably the same and is left for the user to decide manually.

EXAMPLE 1

AUTO: EQUAL(DUNS) AND EQUAL(TAX)
MANUAL(high): EQUAL(DUNS) AND (NULL(TAX, source) OR NULL(TAX, target))
MANUAL(high): EQUAL(TAX) AND (NULL(DUNS, source) OR NULL(DUNS, target))

Example 2 shows two rules with some data manipulation commands. First, the PARTNUMBER is normalized in both the source and the target. In one or more embodiments of the invention the command as specified may operate on only the source unless a comma is placed before the field name meaning that the source field would not be normalized while the target value would be normalized. Next the leftmost 20 characters of the PARTNUMBER are extracted, then an automatic certainty rule is specified requiring both source and target to contain the PARTNUMBER. The next rule begins with a command to extract the rightmost 18 characters from the PARTNUMBER, the field of which is already normalized as per the first command in the rule group. A manual certainty rule is then specified if the 18 rightmost PARTNUMBER characters match the target field PARTNUMBER.

EXAMPLE 2

MODIFY: NORMALIZE(PARTNUMBER)
MODIFY: LEFT(PARTNUMBER, 20)
AUTO: CONTAINS(PARTNUMBER)
MODIFY: RIGHT(PARTNUMBER, 18)
MANUAL(medium): CONTAINS(PARTNUMBER)

Example 3 shows two rules. First an automatic certainty rule is specified if both source and target object have equal DUNS values AND the specified sub objects related to ADDRESS in the source or target match their normalized POSTAL_CODE and CITY and STREET and NUMBER. In addition, a manual high certainty rule follows that specifies that sub objects related to the ADDRESS, namely POSTAL CODE and CITY and STREET must be equal for the user to manually confirm that the objects are indeed a match.

EXAMPLE 3

AUTO: EQUAL(DUNS) AND
OBJECT-BEGIN(ADDRESS, *, ANY)
NORMALIZE(POSTAL_CODE)
EQUAL(POSTAL_CODE) AND EQUAL(CITY) AND EQUAL(STREET) AND EQUAL(NUMBER).
OBJECT-END(ADDRESS).
MANUAL(high): OBJECT-BEGIN(ADDRESS, *, ANY).
(EQUAL(POSTAL_CODE) OR EQUAL(CITY)) AND EQUAL(STREET)
OBJECT-END(ADDRESS)

Example 4 shows a variation of the above rule where a SELECTION has been made for a plant number (PLANTNR) equal to 100. I.e., for a plant dependent sub object, the selection plant=100 specifies what sub objects should be used in the match.

EXAMPLE 4

AUTO: EQUAL(GTIN).
OBJECT-BEGIN(PLANTDATA, PLANTNR=100, ALL)
AUTO: EQUAL . . .
OBJECT-END.

Example 5 shows a manual medium certainty rule wherein the PARTNUMBER of the source being equal to the GTIN of the target satisfies the rule, OR the PARTNUMBER of the source and the UPC of the target satisfies the rule, OR both the source and target PARTNUMBERS are equal.

EXAMPLE 5

MANUAL(medium): EQUAL(source=PARTNUMBER, target=GTIN) OR EQUAL(source=PARTNUMBER, target=UPC) OR EQUAL(source=PARTNUMBER, target=PARTNUMBER)

Example 6 shows a manual high certainty rule that is satisfied when the DESCRIPTION field of the source CONTAINS the GTIN field of the target.

EXAMPLE 6

MANUAL(high): CONTAINS(source=DESCRIPTION, target=GTIN).

Figure 7:
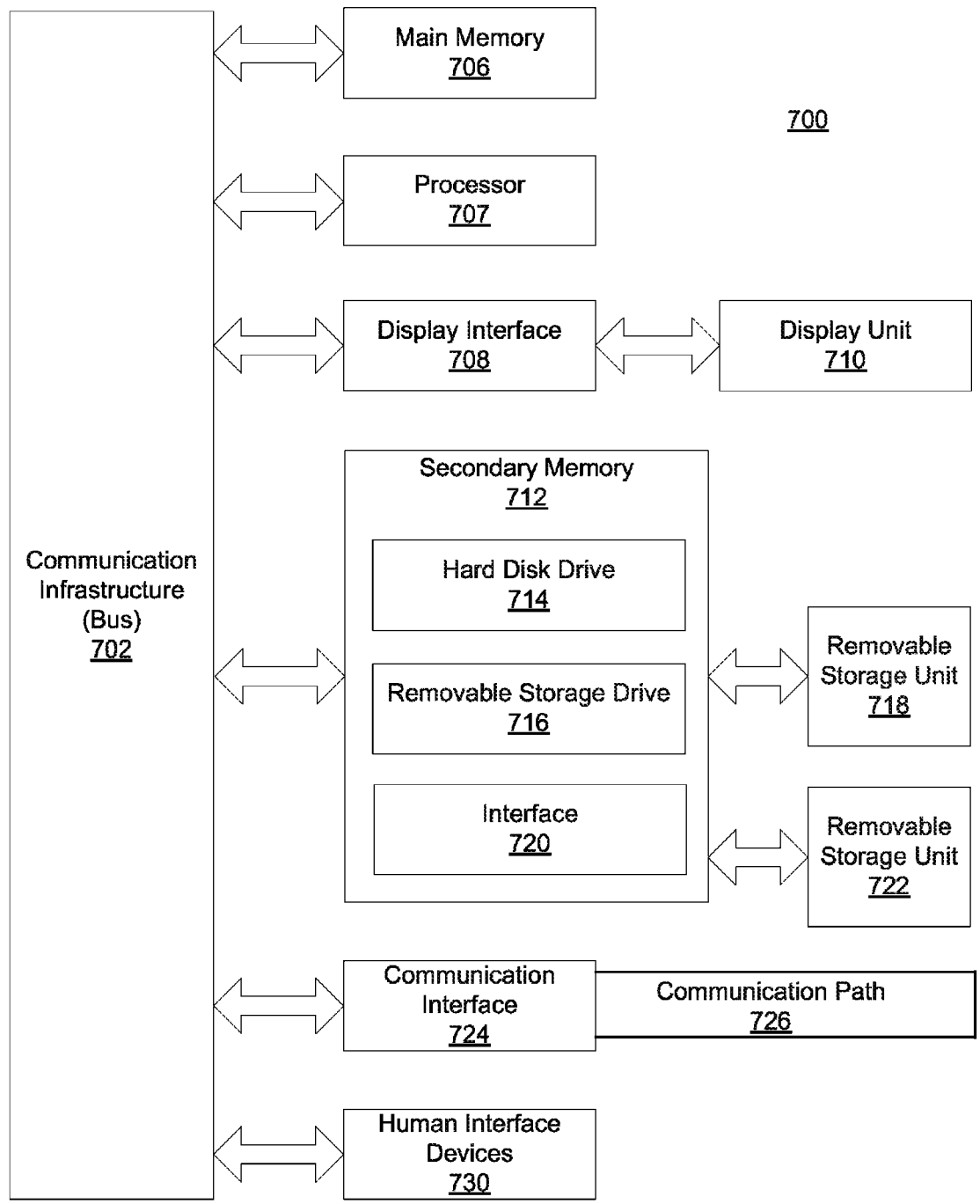
FIG. 7 illustrates a general-purpose computer and peripherals that when programmed as described herein may operate as a computer programmed to implement one or more methods, apparatus and/or systems of the solution.

FIG. 7 depicts a general-purpose computer and peripherals, when programmed as described herein, may operate as a computer programmed to implement one or more methods, apparatus and/or systems of the solution described in this disclosure. Processor 707 may be coupled to bi-directional communication infrastructure 702 such as Communication Infrastructure (Bus) 702. Communication Infrastructure 702 may generally be a system bus that provides an interface to the other components in the general-purpose computer system such as Processor 707, Main Memory 706, Display Interface 708, Secondary Memory 712 and/or Communication Interface 724.

Main memory 706 may provide a computer readable medium for accessing and executing stored data and applications. Display Interface 708 may communicate with Display Unit 710 that may be utilized to display outputs to the user of the programmed computer system. Display Unit 710 may comprise one or more monitors that may visually depict aspects of the computer program to the user. Main Memory 706 and Display Interface 708 may be coupled to Communication Infrastructure 702, which may serve as the interface point to Secondary Memory 712 and Communication Interface 724. Secondary Memory 712 may provide additional memory resources beyond main Memory 706, and may generally function as a storage location for computer programs to be executed by Processor 707. Either fixed or removable computer-readable medium may serve as Secondary Memory 712. Secondary Memory 712 may comprise, for example, Hard Disk 714 and Removable Storage Drive 716 that may have an associated Removable Storage Unit 718. There may be multiple sources of Secondary Memory 712 and systems implementing the solutions described in this disclosure may be configured as needed to support the data storage requirements of the user and the methods described herein. Secondary Memory 712 may also comprise Interface 720 that serves as an interface point to additional storage such as Removable Storage Unit 722. Numerous types of data storage devices may serve as repositories for data utilized by the specially programmed computer system. For example, magnetic, optical or magnetic-optical storage systems, or any other available mass storage technology that provides a repository for digital information may be used.

Communication Interface 724 may be coupled to Communication Infrastructure 702 and may serve as a conduit for data destined for or received from Communication Path 726. A Network Interface Card (NIC) is an example of the type of device that once coupled to Communication Infrastructure 702 may provide a mechanism for transporting data to Communication Path 726. Computer networks such Local Area Networks (LAN), Wide Area Networks (WAN), Wireless networks, optical networks, distributed networks, the Internet or any combination thereof are some examples of the type of communication paths that may be utilized by the specially program computer system. Communication Path 726 may comprise any type of telecommunication network or interconnection fabric that can transport data to and from Communication Interface 724.

To facilitate user interaction with the specially programmed computer system, one or more Human Interface Devices (HID) 730 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to Processor 707 to trigger one or more responses from the specially programmed computer are within the scope of the system disclosed herein.

While FIG. 7 depicts a physical device, the scope of the system may also encompass a virtual device, virtual machine or simulator embodied in one or more computer programs executing on a computer or computer system and acting or providing a computer system environment compatible with the methods and processes of this disclosure. Where a virtual machine, process, device or otherwise performs substantially similarly to that of a physical computer system, such a virtual platform will also fall within the scope of disclosure provided herein, notwithstanding the description herein of a physical system such as that in FIG. 7.

One or more embodiments are configured to enable the specially programmed computer to take the input data given and transform it into a web-based UI by applying one or more of the methods and/or processes described herein. Thus the methods described herein are able to transform a stored component into a web UI, using the solution disclosed here to result in an output of the system as a web UI design support tool, using the specially programmed computer as described herein.

U.S. patent application Ser. No. 09/577,268 entitled "Timeshared Electronic Catalog System And Method" filed May 23, 2000, U.S. Pat. No. 6,754,666 entitled "Efficient Storage And Access In A Database Management System" filed Aug. 21, 2000, U.S. patent application Ser. No. 09/643,316 entitled "Data Indexing Using Bit Vectors" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 10/022,056 entitled "Method And Apparatus For Transforming Data" filed Dec. 12, 2001, U.S. patent application Ser. No. 09/960,541 entitled "Method And Apparatus For Dynamically Formatting And Displaying Tabular Data In Real Time" filed Sep. 20, 2001, U.S. patent application Ser. No. 10/172,572 entitled "Method And Apparatus For Generating And Utilizing Qualifiers And Qualified Taxonomy Tables" filed Jun. 13, 2002, U.S. patent application Ser. No. 10/990,293, entitled "Accelerated System And Methods For Synchronizing, Managing, And Publishing Business Information" filed Nov. 15, 2004, U.S. patent application Ser. No. 10/990,292 entitled "System And Method For Dynamically Constructing Synchronized Business Information User Interfaces" filed Nov. 15, 2004, U.S. patent application Ser. No. 10/990,294 entitled "System And Method For Dynamically Modifying Synchronized Business Information Server Interfaces" filed Nov. 15, 2004, are all hereby incorporated herein by reference in their entirety.

While the invention herein disclosed has been described by means of specific embodiments and applications thereof, numerous modifications and variations could be made thereto by those skilled in the art without departing from the scope of the invention set forth in the claims.

What is claimed is:

1. An object matching system comprising:
a plurality of disparate databases comprising data objects; and a master data server comprising a computer programmed to provide:
a plurality of adapters configured to connect to said plurality of disparate databases;
a matching module configured to obtain an object matching rule and to determine all matching data objects, where the matching module is to determine that when a first parent object and a second parent object each comprises sub objects, the matching module will determine and save all data object matches by traversing the sub objects until all matches are determined and saved wherein the object matching rule includes certainty testing that comprises both an automatic matching rule and a manual matching rule, wherein the automatic matching rule determines if both a source and a target object have equal values associated with a first field and specified sub objects match normalized values associated with the first field, and wherein the manual matching rule determines if sub objects related to the first field are equal; and
a data integrator configured to merge at least two of the saved matching data objects to produce a master data object.

2. The computer readable medium of claim 1, wherein the object matching rule is associated with a first portion of a data object's fields and a next highest priority rule matches the data object's fields other than the first portion of the data object's fields.

3. The computer readable medium of claim 1, wherein the object matching rule is a converse to a next highest priority object matching rule, wherein the next highest priority rule comprises determining that a match exists for a source or target object that has a NULL value for a first field when both the source and target objects have a same value for a second field and wherein the converse comprises determining that a match exists for a source or target object that has a NULL value for the second field when both the source and target objects have a same value for the first field.

4. The computer readable medium of claim 1, wherein the object matching rule is associated with a first portion of a data object's fields and a next highest priority rule matches at least one of data object's fields other than the first portion of the data object's fields.

5. The system of claim 1, wherein the matching module determines near matches that signify true matches based on transposition of letters, doubling of letters, and adjacent-on-keyboard letters.

6. The system of claim 1, wherein each adapter of the plurality of adapters is customized to interface to a specific disparate database.

7. A computer readable medium comprising computer readable instructions stored therein, wherein said computer readable instructions comprise:
connecting to a plurality of disparate databases; obtaining a source object and a target parent object where the source object comprises sub objects and the target object comprises sub objects from said plurality of disparate databases;
obtaining an object matching rule wherein the object matching rule includes certainty testing that comprises both an automatic matching rule and a manual matching rule, wherein the automatic matching rule determines if both a source and a target object have equal values associated with a first field and specified sub objects match normalized values associated with the first field, and wherein the manual matching rule determines if sub objects related to the first field are equal;
comparing the source object and the target object and each respective sub object utilizing said object matching rule to determine all matching data objects by traversing the sub objects until all matches are determined;
saving the determined matches; and
merging at least two of the saved matching data objects to create a master data object.

8. The computer readable medium of claim 7, wherein said computer readable instructions further comprise:
matching data sub objects utilizing said object matching rule; and
merging matching data sub objects into said master data object.

9. The computer readable medium of claim 7, wherein the certainty testing specifies a low probability that the at least two of said plurality of data objects are matches and that a manual verification is needed.

10. The medium of claim 7, wherein the matching module determines near matches that signify true matches based on transposition of letters, doubling of letters, and adjacent-on-keyboard letters.

11. The medium of claim 7, wherein each adapter of the plurality of adapters is customized to interface to a specific disparate database.

12. An object matching system comprising:
a plurality of disparate databases comprising data objects; and a master data server comprising a computer programmed to provide:
a plurality of adapters configured to connect to said plurality of disparate databases;
a matching module configured to (i) obtain an object matching rule associated with a first portion of a data object's fields, (ii) compare data objects provided by said plurality of adapters through use of the object matching rule, wherein the data objects comprise a source object and a target object and the source object and the target object each comprise sub objects and (iii) compare the source object and the target object and each respective sub object utilizing said object matching rule to determine and save all matching data objects by traversing the sub objects until all matches are determined wherein the object matching rule includes certainty testing that comprises both an automatic matching rule and a manual matching rule, wherein the automatic matching rule determines if both a source and a target object have equal values associated with a first field and specified sub objects match normalized values associated with the first field, and wherein the manual matching rule determines if sub objects related to the first field are equal; and
a data integrator configured to merge at least two matching data objects of the saved matching data objects to produce a master data object.

13. The system of claim 12, wherein the object matching rule is associated with a first portion of a data object's fields and a next highest priority rule matches the data object's fields other than the first portion of the data object's fields.

14. The system of claim 12, wherein the object matching rule is a converse to a next highest priority object matching rule, wherein the next highest priority rule comprises determining that a match exists for a source or target object that has a NULL value for a first field when both the source and target objects have a same value for a second field and wherein the converse comprises determining that a match exists for a source or target object that has a NULL value for the second field when both the source and target objects have a same value for the first field.

15. The system of claim 12, wherein the matching module determines near matches that signify true matches based on transposition of letters, doubling of letters, and adjacent-on-keyboard letters.

16. The system of claim 12, wherein each adapter of the plurality of adapters is customized to interface to a specific disparate database.

* * * * *